United States Patent
Chinnam et al.

(10) Patent No.: US 8,272,763 B1
(45) Date of Patent: Sep. 25, 2012

(54) LED LUMINAIRE

(75) Inventors: Solomon Raju S. Chinnam, Kyle, TX (US); Paul J. Hundt, Garland, TX (US); Sainath A. Thoppil, Carrollton, TX (US); Paul A. Chintapalli, Plano, TX (US)

(73) Assignee: Genesis LED Solutions, Plano, TX (US)

( * ) Notice: Subject to any disclaimer, the term of this patent is extended or adjusted under 35 U.S.C. 154(b) by 209 days.

(21) Appl. No.: 12/894,820

(22) Filed: Sep. 30, 2010

Related U.S. Application Data

(60) Provisional application No. 61/278,035, filed on Oct. 2, 2009, provisional application No. 61/340,639, filed on Mar. 22, 2010.

(51) Int. Cl.
*F21V 21/00* (2006.01)

(52) U.S. Cl. ............ 362/249.07; 362/249.03; 362/294; 362/249.1; 362/147

(58) Field of Classification Search .......... 362/147, 362/148, 249.03, 249.06, 249.07, 294, 373
See application file for complete search history.

(56) References Cited

U.S. PATENT DOCUMENTS

| | | | | |
|---|---|---|---|---|
| 5,172,976 A | * | 12/1992 | Bogdanovs | 362/374 |
| 6,367,955 B1 | * | 4/2002 | Rhee | 362/368 |
| 6,739,734 B1 | | 5/2004 | Hulgan | |
| 7,625,104 B2 | | 12/2009 | Zhang | |
| 7,658,510 B2 | | 2/2010 | Russell | |
| 7,686,484 B2 | | 3/2010 | Heiking | |
| 7,703,951 B2 | | 4/2010 | Piepgras | |
| 7,712,918 B2 | | 5/2010 | Siemiet | |
| 7,810,948 B2 | * | 10/2010 | Ogashiwa | 362/239 |
| 7,862,195 B2 | * | 1/2011 | Stack et al. | 362/125 |
| 7,972,035 B2 | * | 7/2011 | Boyer | 362/289 |
| 8,038,318 B2 | * | 10/2011 | Plunk | 362/235 |
| 2007/0247842 A1 | | 10/2007 | Zampini | |
| 2008/0089069 A1 | | 4/2008 | Medendorp | |
| 2008/0089071 A1 | * | 4/2008 | Wang | 362/294 |
| 2009/0323339 A1 | * | 12/2009 | Janos et al. | 362/249.1 |
| 2010/0142202 A1 | * | 6/2010 | Sugishita et al. | 362/235 |

* cited by examiner

*Primary Examiner* — Ali Alavi

(74) *Attorney, Agent, or Firm* — Neustel Law Offices

(57) ABSTRACT

The light fixture includes a ceiling mounted, hollow support body generally comprised of pre-existing fluorescent lighting troffer, a base plate hingedbly mounted to the support body preferably via a hook/slot assembly and comprised of a heat dissipating aluminum material, a power supply unit mounted along a top of the base plate, a plurality of lighting units, each being electrically connected to the power supply unit, and each being mounted to the base plate, the plurality of lighting units each including at least one light emitting element. The lighting units are comprised of a plurality of individual strips dispersed along the bottom of the base plate for optimal heat dispersion. The base plate may have flat or angled mounting surfaces for the lighting units depending on a direction of emitted light and heat dissipation. A diffuser panel may be spaced below the lighting units and hingedbly mounted to the support body.

20 Claims, 10 Drawing Sheets

__US 8,272,763 B1__

LED LUMINAIRE

CROSS REFERENCE TO RELATED APPLICATIONS

I hereby claim benefit under Title 35, United States Code, Section 119(e) of U.S. provisional patent application Ser. No. 61/278,035 filed Oct. 2, 2009 and provisional patent application Ser. No. 61/340,639 filed Mar. 22, 2010. The 61/278,035 and 61/340,639 applications are currently pending. The 61/278,035 and 61/340,639 applications are hereby incorporated by reference into this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to a light fixture and more specifically it relates to an LED luminaire for providing an efficient, easy-to-install retrofit or new luminaire.

2. Description of the Related Art

Any discussion of the related art throughout the specification should in no way be considered as an admission that such related art is widely known or forms part of a common general knowledge in the field.

Light fixtures have been in use for years and are structured in various manners to accommodate the desired lighting condition. It may be desirable to incorporate LED lighting assemblies with an existing fluorescent light fixture. However, prior art generally only comprises LED tubes and/or difficult-to-mount light fixtures that do not properly disperse light and/or dissipate heat. Because of the inherent problems with the related art, there is a need for a new and improved LED luminaire for providing an efficient, easy-to-install retrofit or new luminaire.

BRIEF SUMMARY OF THE INVENTION

A system for providing an efficient, easy-to-install retrofit or new luminaire. The invention generally relates to a light fixture which includes a ceiling mounted, hollow support body generally comprised of pre-existing fluorescent lighting troffer, a base plate hingedbly mounted to the support body preferably via a hook/slot assembly and comprised of a heat dissipating aluminum material, a power supply unit mounted along a top of the base plate, a plurality of lighting units, each being electrically connected to the power supply unit, and each being mounted to the base plate, the plurality of lighting units each including at least one light emitting element. The lighting units are comprised of a plurality of individual strips dispersed along the bottom of the base plate for optimal heat dispersion. The base plate may have flat or angled mounting surfaces for the lighting units depending on a direction of emitted light and heat dissipation. A diffuser panel may be spaced below the lighting units and hingedbly mounted to the support body.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

Figure 1:
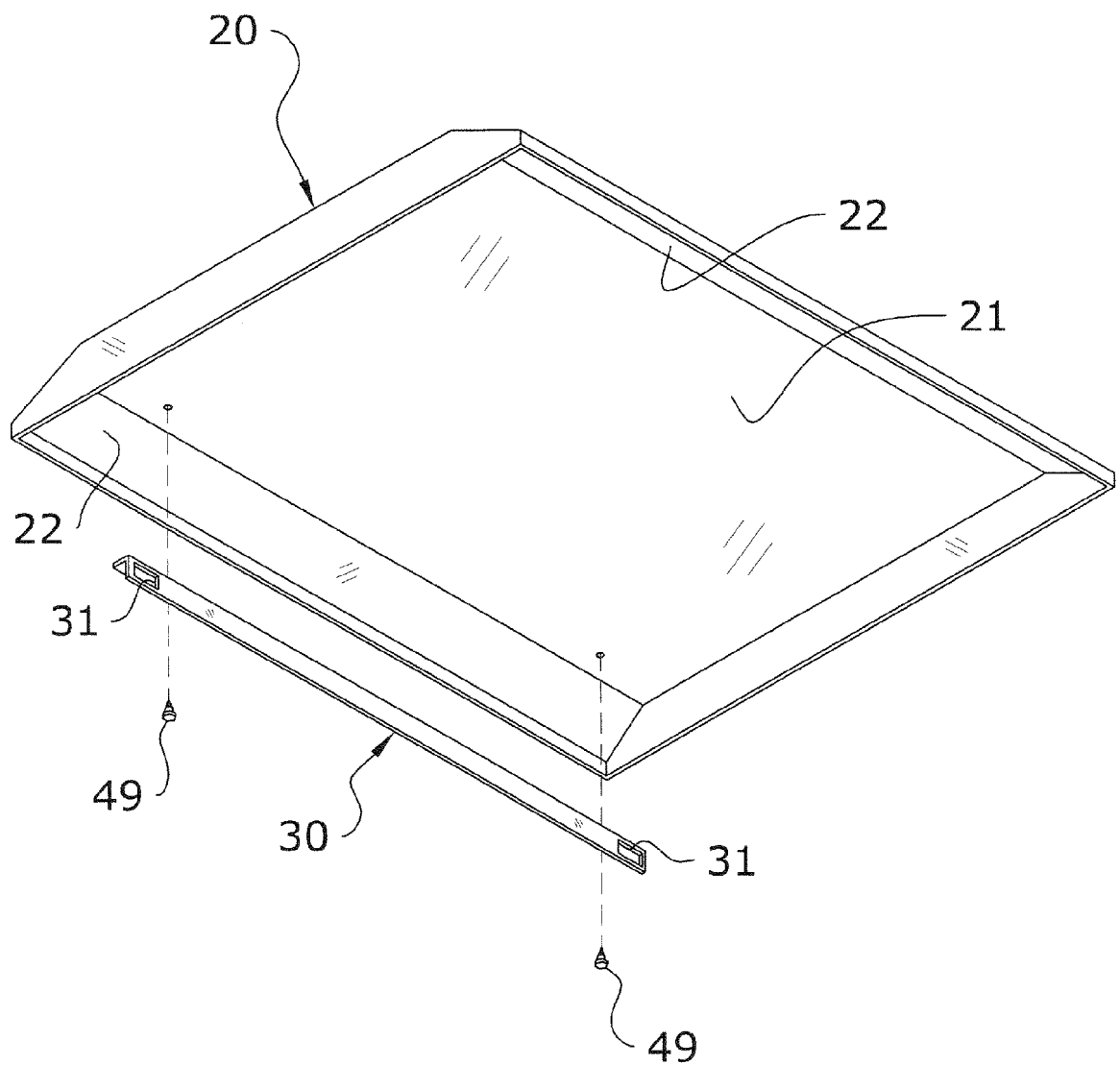
FIG. 1 is a lower perspective view of the hinge mount exploded from the support body.

A. Overview.

Turning now descriptively to the drawings, in which similar reference characters denote similar elements throughout the several views, FIGS. 1 through 13 illustrate a LED luminaire 10, which comprises a ceiling mounted, hollow support body 20 generally comprised of pre-existing fluorescent lighting troffer, a base plate 40 hingedbly mounted to the support body 20 preferably via a hook/slot assembly and comprised of a heat dissipating aluminum material, a power supply unit 50 mounted along a top of the base plate 40, a plurality of lighting units and/or LED strips/panels 60, each being electrically connected to the power supply unit 50, and each being mounted to the base plate 40, the plurality of lighting units 60 each including at least one light emitting element 62. The lighting units 60 are comprised of a plurality of individual strips dispersed along the bottom of the base plate 40 for optimal heat dispersion. The base plate 40 may have flat or angled mounting surfaces 46 for the lighting units 60 depending on a direction of emitted light and heat dissipation. A diffuser panel 70 may be spaced below the lighting units 60 and hingedbly mounted to the support body 20. The light fixture 10 is generally used for indoor lighting; however outdoor lighting embodiments may be appreciated.

B. Support Body.

As stated, the support body 20 is generally hollow and ceiling mounted. The support body 20 generally includes a top panel 21 that is mounted to or adjacent a ceiling and a plurality of side panels 22 extending downwards from the top panel 21, generally either in a perpendicular manner or angled. The side panels 22 and top panel 21 define a hollow structured support body 20 in which the base plate 40 is generally positioned within. The side panels 22 generally extend below the base plate 40 and may be comprised of a reflective surface to better disperse and direct emitted light. The support body 20 may be comprised of various materials, such as but not limited to metal or aluminum to assist the base plate 40 with heat dissipation of the light emitting elements 62, power supply unit 50, etc.

In a retrofit embodiment of the present invention, the support body 20 is comprised of a conventional ceiling mounted or suspended fluorescent troffer (inverted trough), wherein the fluorescent tubes are removed and the base plate 40 is installed and mounted to the support body 20, thus allowing for the user to utilize a pre-existing support body 20 which can substantially ease the mounting and installation process. As will be described, the lower peripheral edge of one of the side panels 22 may include a hooked portion 24 for hingedbly receiving the diffuser panel 70.

C. Hinge Mount.

A hinge mount 30 is preferably attached directly to the inside surface of the support body 20, generally along the top panel 21 or one of the side panels 22 and is structured to be elongated and follow a long side of the support body 20, such as a towel rod structure. Alternately a plurality of hinge mounts 30 may be spaced along the long edge of the interior surface of the support body 20.

The hinge mount(s) 30 includes at least one and preferably a plurality of slots 31 extending therein for receiving the hooked portions 44 of the base plate 40 to pivotally connect the base plate 40 to the hinge mount 30. The hinge mount 30 may also be integral with the support body 20. In another alternate embodiment, the hinge mount 30 may be omitted and the base plate 40 may fixedly attach to the support body 20.

D. Base Plate.

The base plate 40 is generally comprised of a thin, heat dissipating structure adapted to hold the lighting units 60 and power supply unit 50 so that the entire LED assembly may be easily installed, removed for repair and maintenance, etc. by simply removing or attaching the base plate 40 to the support body 20 and hinge mount 30. The base plate 40 is also preferably comprised of an aluminum alloy material, such as to dissipate heat from the lighting units 60 and serve as a heat sink so that a separate heat sink is not needed. The base plate 40 dissipates heat to keep the light emitting elements 62 junction temperature within acceptable levels thus prolonging the life of the light emitting elements 62.

The base plate 40 generally includes a first edge 41 having a hooked portion 44 extending from the first edge 41 and generally integral with the first edge 41, such as being the first edge 41 formed in a curved or hooked manner, the hook portion 44 being entirely along the first edge 41 or being multiple hook portions 44 spaced apart along the first edge 41. The first edge 41 is generally a long edge of the base plate 40, as is the second edge 42. The hooked portions 44 of the first edge 41 correspond with the slots 31 of the hinge mount 30 thus allowing the base plate 40 to pivot or hinge about the support body 20 and hinge mount 30.

The opposing long edge, termed the second edge 42 is generally fixed to the opposing interior side of the support body 20 via fasteners 49, such as screws or bolts. Alternately, in an embodiment without the hinge mount 30, the fasteners 49 may be used to attach both the first edge 41 and the second edge 42 to the interior of the support body 20. The second edge 42 may be spaced vertically upwards from an adjacent mounting surface 46 of the base plate 40 to space the base plate 40 from the support body 20 for heat dissipation purposes.

The base plate 40 generally has a plurality of first mounting surfaces 46 and at least one second mounting surface 47. The first mounting surfaces 46 are for mounting the lighting units 60 thereto along the bottom side of the base plate 40. The first mounting surfaces 46 may parallel the top panel 21 of the support body 20 and extend parallel within a horizontal plane. The first mounting surfaces 46 may also be angled in various manners, such as being jagged to direct the lighting units 60 in various directions and for heat dissipation purposes. Such angled and horizontally planar orientations of the first mounting surfaces 46 of the base plate 40 are illustrated in FIGS. 9 through 12. It is appreciated that the lighting units 60 are generally mounted to all of the angled or flat first mounting surfaces 46 and the first mounting surfaces 46 may be angled or oriented in various alternate manners than those exemplarily illustrated.

The base plate 40 also includes at least one second mounting surface 47 for mounting the power supply unit 50 thereto along a top side of the base plate 40. The second mounting surface 47 generally extends below the first mounting surface 46 or at least extends substantially vertically downwards and may have a flat lower surface for receiving the power supply unit 50 and allowing enough space for the power supply unit 50 when the base plate 40 is hinged upwards and fixed to the support body 20, wherein the power supply unit 50 is positioned above the base plate 40 and beneath the top panel 21 of the support body 20 within the defined hollow space of the support body 20 and away from viewing from below the light fixture 10.

E. Power Supply Unit.

Figure 2:
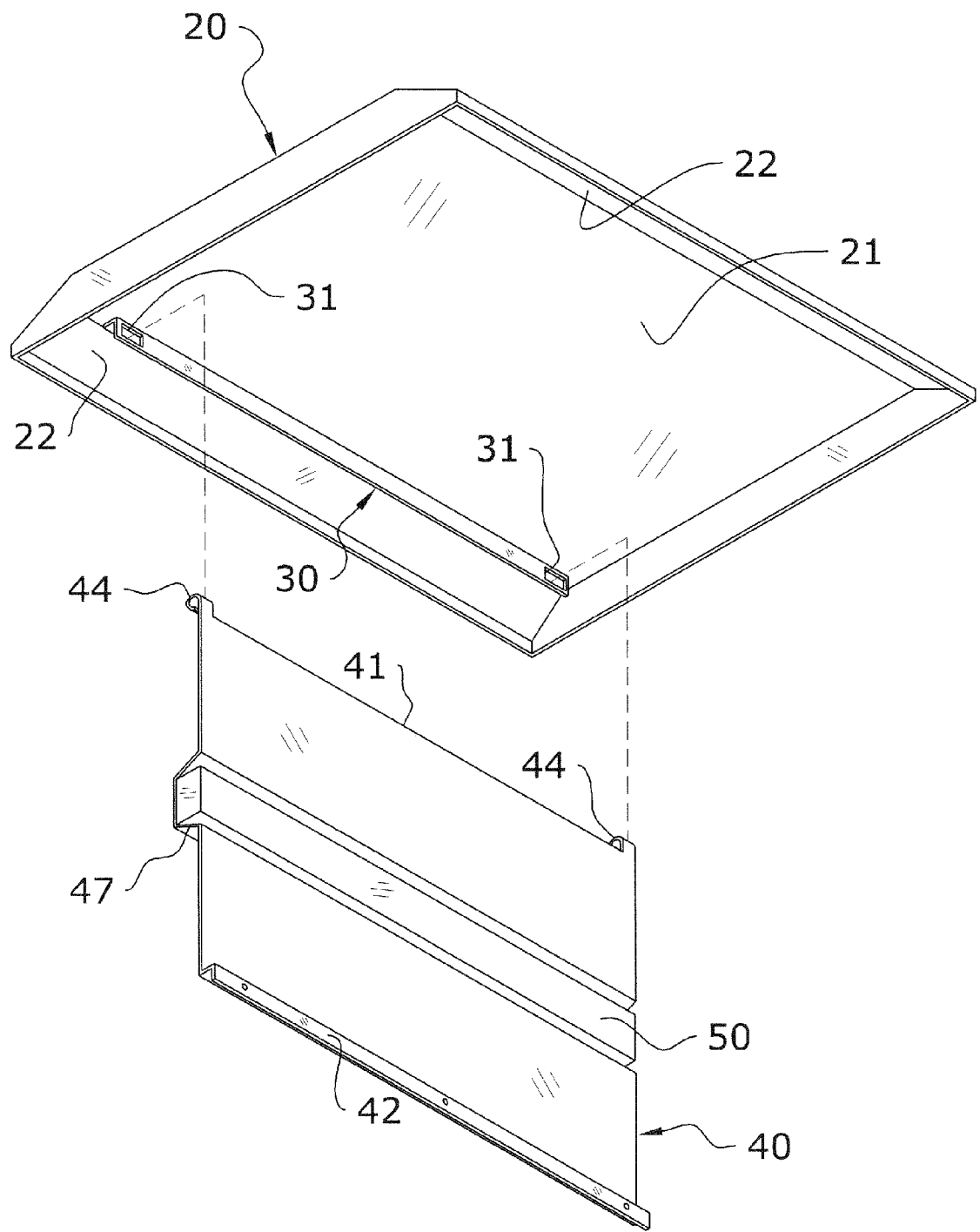
FIG. 2 is a lower perspective view of the hinge mount attached to the support body and the lighting assembly (including the base plate, power supply unit, and lighting units) being aligned with the hinge mount.
Figure 3:
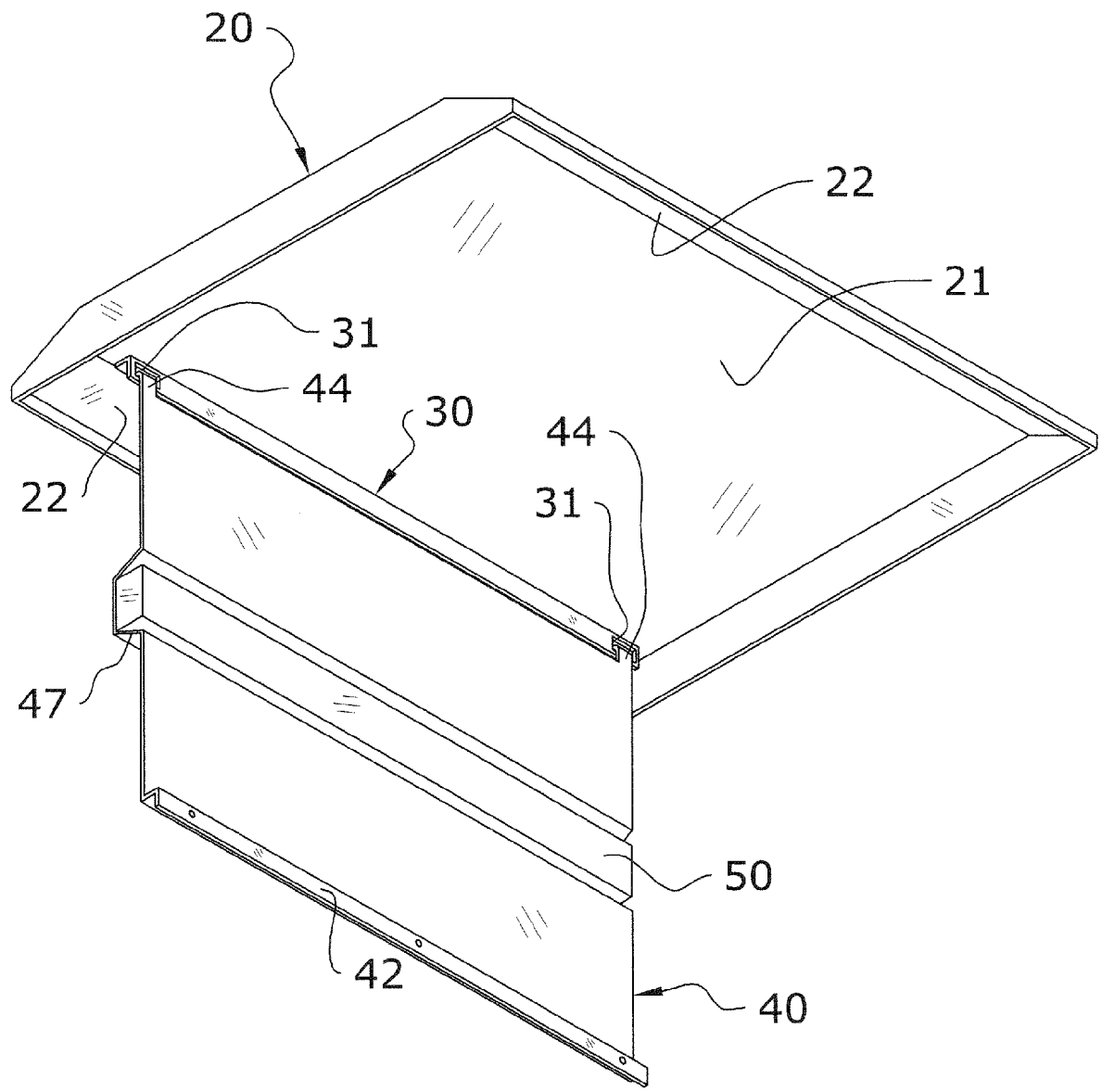
FIG. 3 is a lower perspective view of the hinge mount attached to the support body and the lighting assembly being hingedbly attached to the hinge mount.
Figure 4:
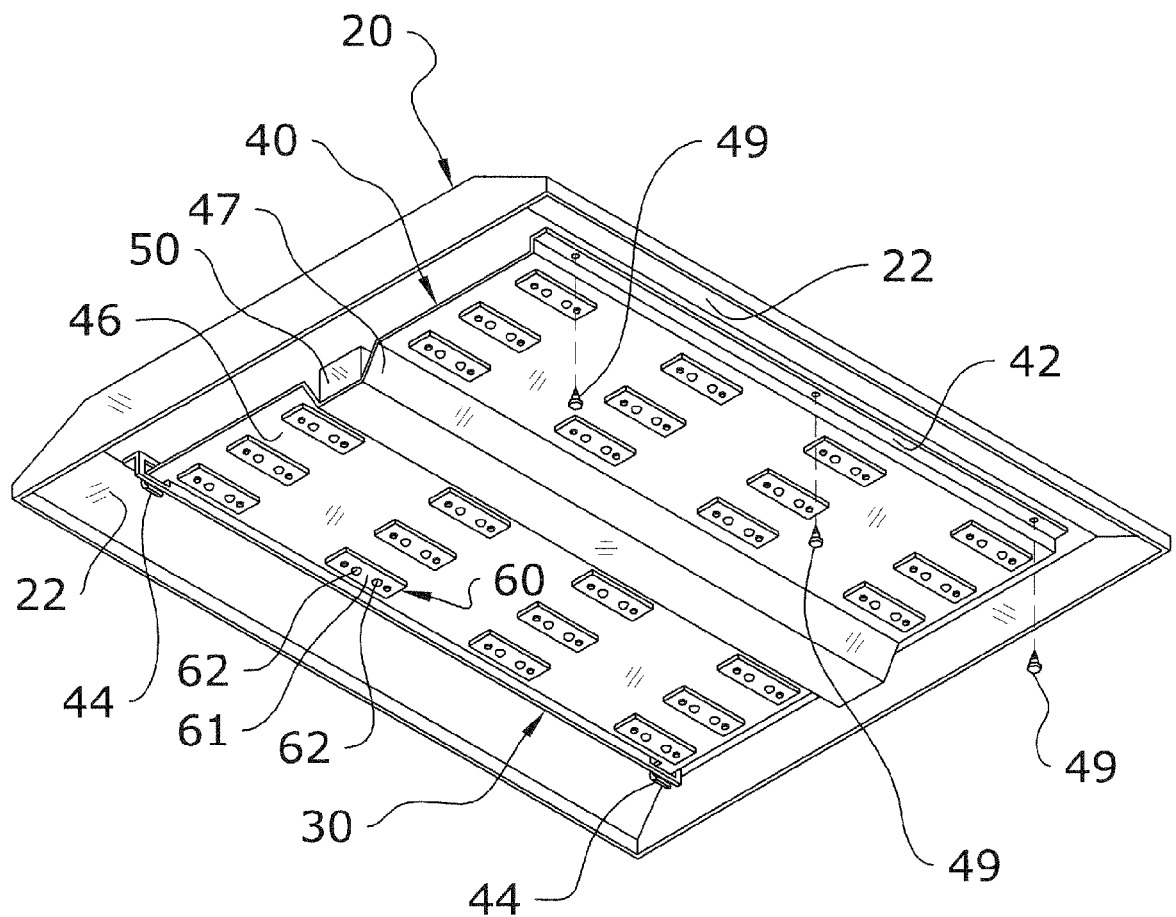
FIG. 4 is a lower perspective view of the hinge mount attached to the support body and the lighting assembly being hinged to a horizontal orientation.
Figure 5:
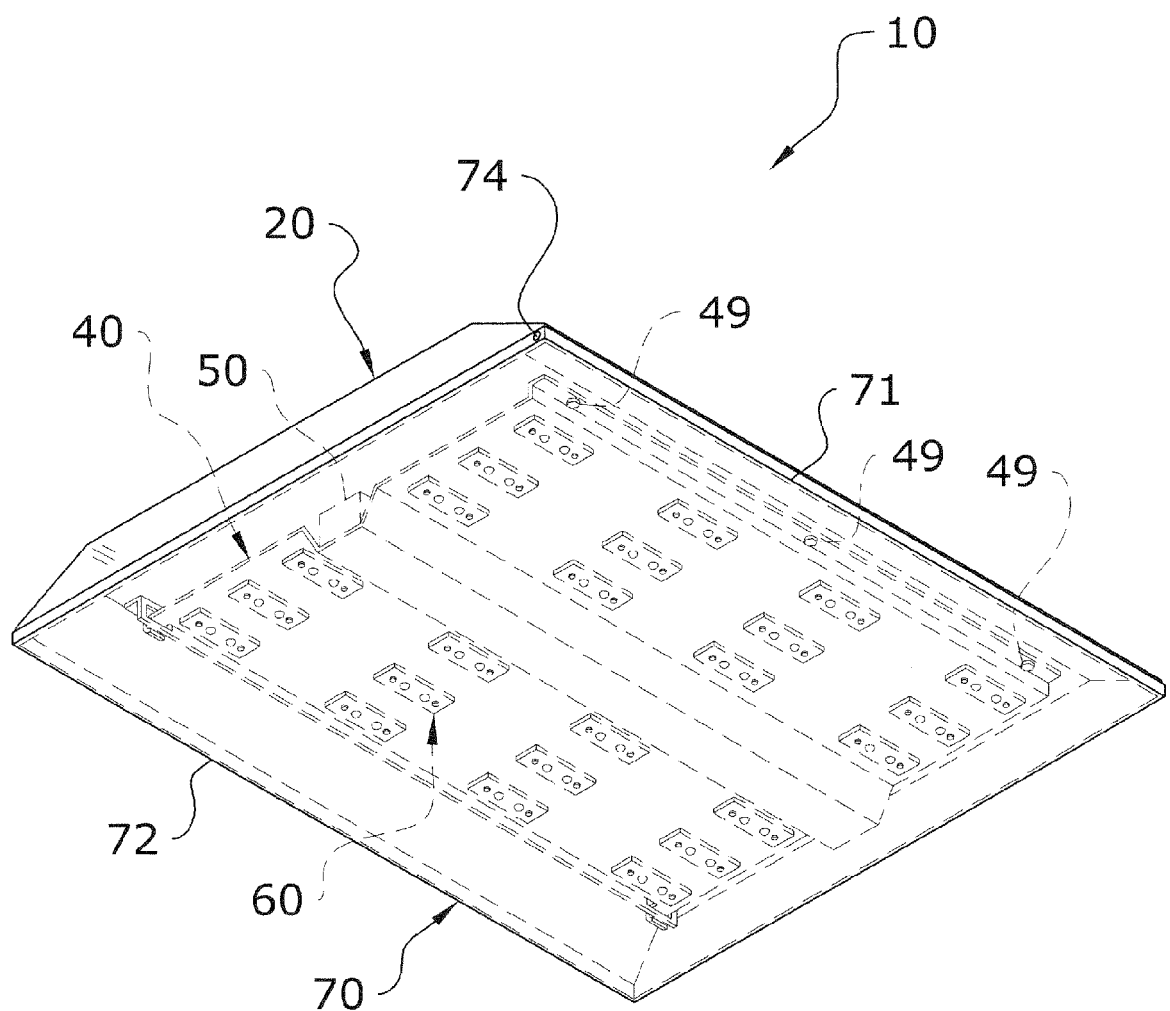
FIG. 5 is a lower perspective view of the lighting assembly attached to the support body.
Figure 6:
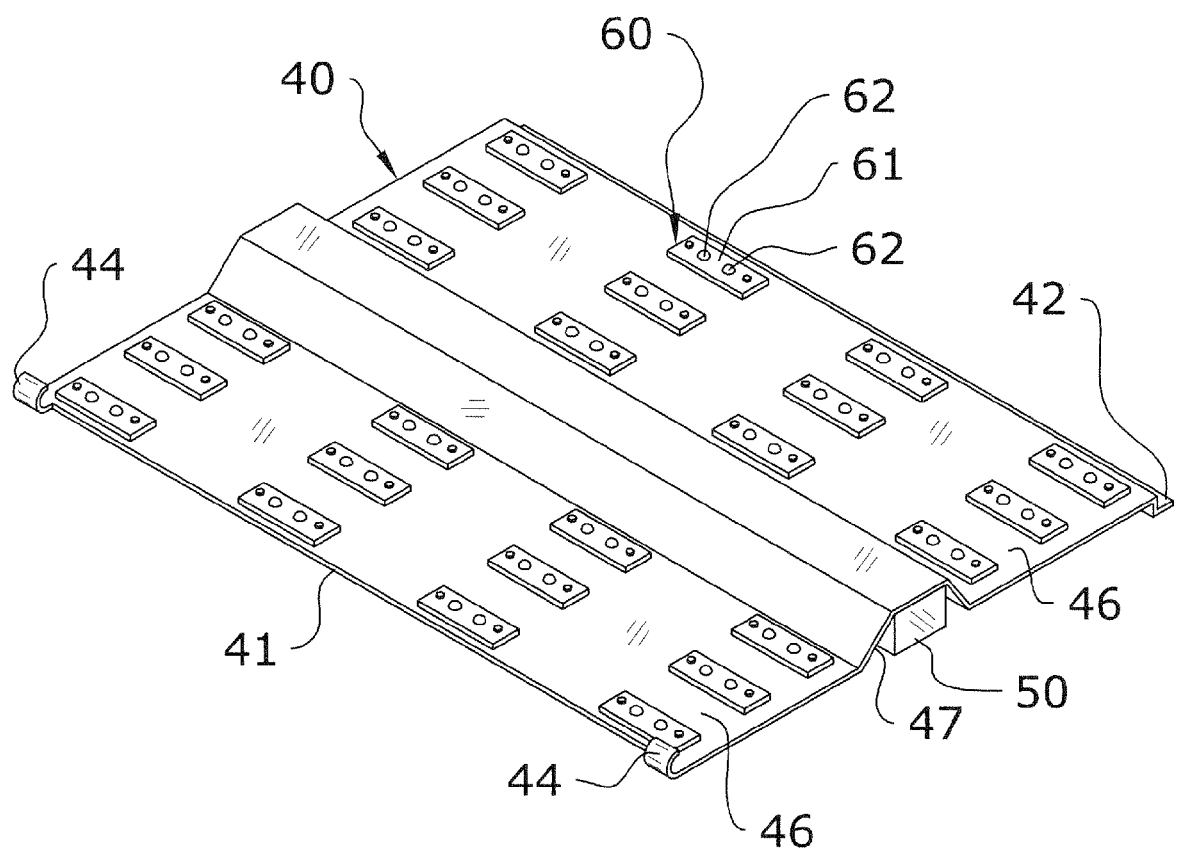
FIG. 6 is an upper perspective view of the lighting assembly.
Figure 7:
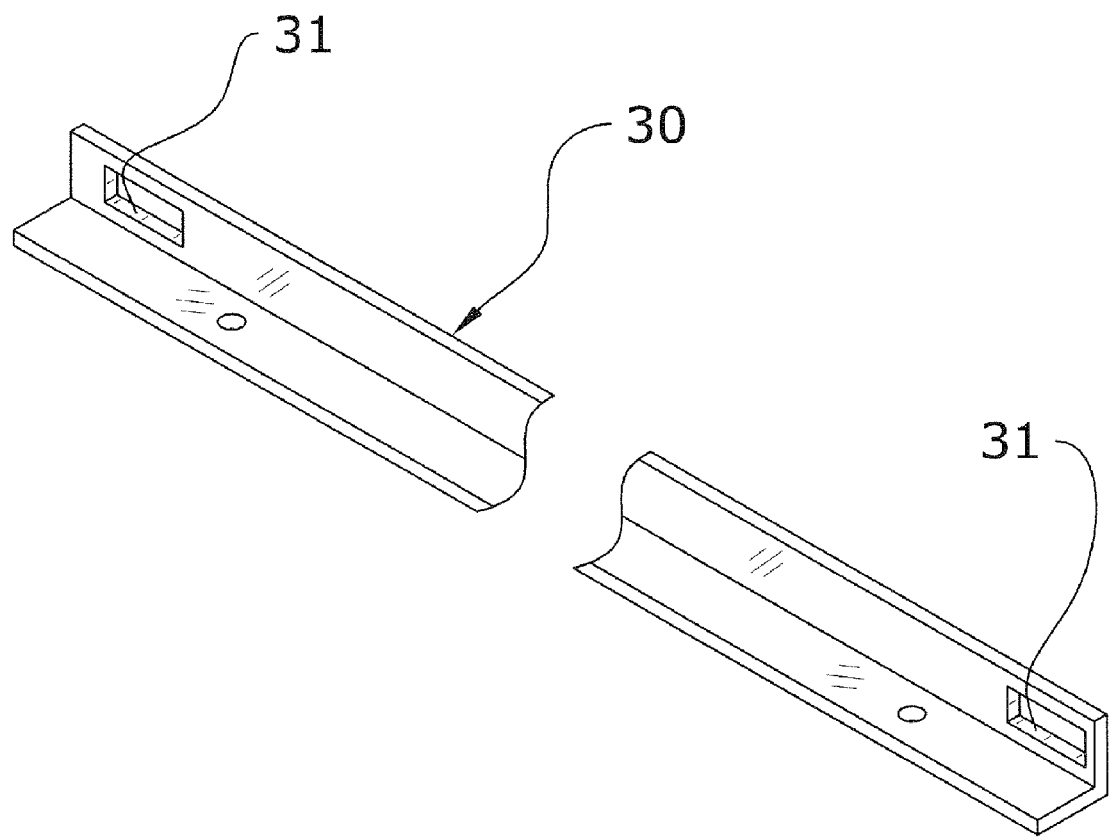
FIG. 7 is a cutaway upper perspective view of the hinge mount.

As described, the power supply unit 50 is attached to a top side of the base plate 40 to pivot with the base plate 40 and thus allow for easy installation and maintenance of the power supply unit 50, wherein the entire base plate 40 including the power supply unit 50 and the lighting units 60 may be installed and/or removed as a one-piece structure ("lighting assembly") as illustrated in FIGS. 2 through 4. The power supply unit 50 may alternately extend below the bottom side of the base plate 40, such as being mounted to the bottom side or extending through an opening in the base plate 40. The power supply unit 50 is generally electrically connected to all of the lighting units 60. It is appreciated that multiple power supply units 50 may be utilized.

The power supply unit 50 is generally directly wired to the lighting units 60 through or along the base plate 40 so the base plate 40, power supply unit 50, and lighting units 60 are essentially installed and removed as one-piece. The power supply unit 50 includes a constant voltage and current driver for converting an incoming AC power supply source to a DC power supply source for the lighting units 60. Other features, such as short circuit protection, over-voltage protection, over-temperature protection are generally included with the power supply unit 50.

F. Lighting Units.

The lighting units 60 are attached to the first mounting surfaces 46 of the base plate 40 generally prior to the base plate 40 being mounted to the support body 20 for ease of installation. The lighting units 60 are each preferably comprised of a narrow, shortened and substantially-flat strip structure and are dispersed along the bottom side of the base plate 40 and attached thereto. The lighting units 60 may be angled in various manners to correspond and parallel the particular mounting surface 46 that the particular lighting unit 60 is attached thereto. The lighting units 60 are generally spaced apart along the entire surface area of the first mounting surfaces 46.

Figure 13:
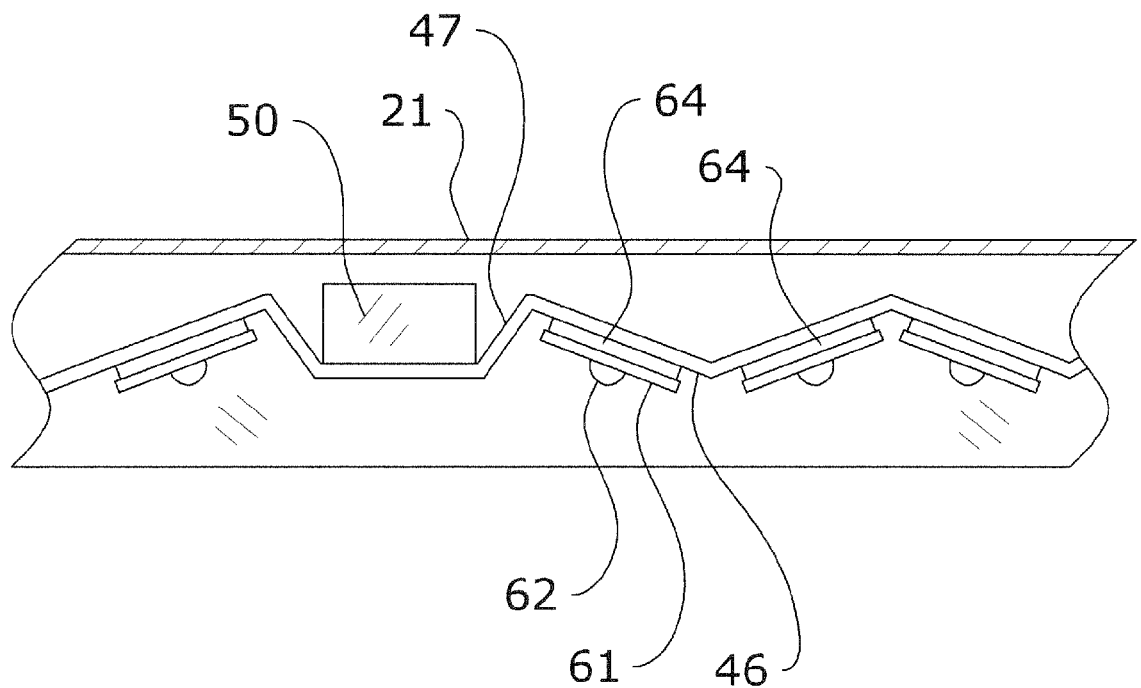
FIG. 13 is a zoomed side view showing the thermal adhesive being used to connect the lighting unit to the base plate.

Each of the lighting units 60 generally comprise a lighting flat, paneled circuit 61 and one or more light emitting elements 62, such as LEDs, electrically connected thereto. The lighting circuit 61 is electrically connected to the power supply unit 50. The lighting circuit 61 allows for the light emitting elements 62 to be driven at various currents for higher lumens and color variations. The lighting circuit 61 is generally the portion of the lighting unit 60 connected to the base plate 40. The lighting circuit 61 may be connected to the base plate 40 in various manners, such as adhesives 64 as illustrated in FIG. 13 and/or fasteners. The adhesives 64 are generally thermal adhesives 64 to absorb heat for assisting the base plate 40 in dissipating heat from the light emitting elements 62. The adhesives 64 may also be comprised of an adhesive/screen structure or various other heat dissipating compounds.

G. Diffuser Panel.

The present invention may include a diffuser panel 70 suspended below the light emitting elements 62 of the lighting units 60. The diffuser panel 70 is spaced further apart from the light emitting elements 62 than conventional diffusers to minimize or substantially eliminate hot spots created by direction of the emitted light towards the diffuser panel 70. By spacing the diffuser panel 70 from the light emitting elements 62, the emitted light dispersion widens thus lessening the portion of the emitted light on a particular portion of the diffuser panel 70, and also essentially eliminating glare created by light being sharply focused upon the diffuser panel 70 due to the diffuser panel 70 being positioned too close to the light emitting elements 62.

The diffuser panel 70 may be comprised of various translucent or transparent structures as appreciated and desired to direct the emitted light from the light emitting elements 62. Various hatched or other patterns may also be utilized with the diffuser panel 70 for dispersing and/or directing emitted light from the light emitting elements 62. Additionally, square, rectangular, or various other shaped structures may be employed by the diffuser panel 70 to accommodate and fill the opening formed by the side panels 22 leading to the hollow structures support body 20.

The diffuser panel 70 is mounted below the base plate 40 and the lighting units 60 and is preferably mounted to the lower end of the support body 20, thus substantially encasing the base plate 40, lighting units 60, and power supply unit 50 within the hollow structure of the support body 20. A first long edge 71 of the diffuser panel 70 is generally pivotally connected to the support body 20, wherein the second or opposite long edge 72 of the diffuser panel 70 is affixed to the opposing side of the support body 20 when the diffuser panel 70 is pivoted to a horizontal position, similar to the base plate 40, via fasteners or another hooked portion 75.

Figure 8:
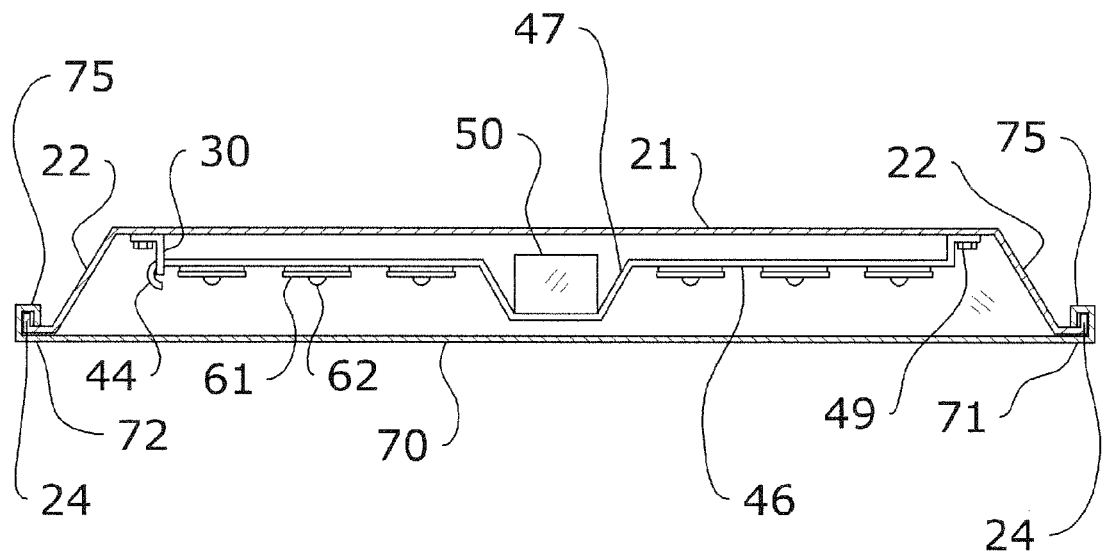
FIG. 8 is a front sectional view of the present invention illustrating the diffuser panel mounted to the support body and the diffuser panel including hooked portions along each edge.
Figure 9:
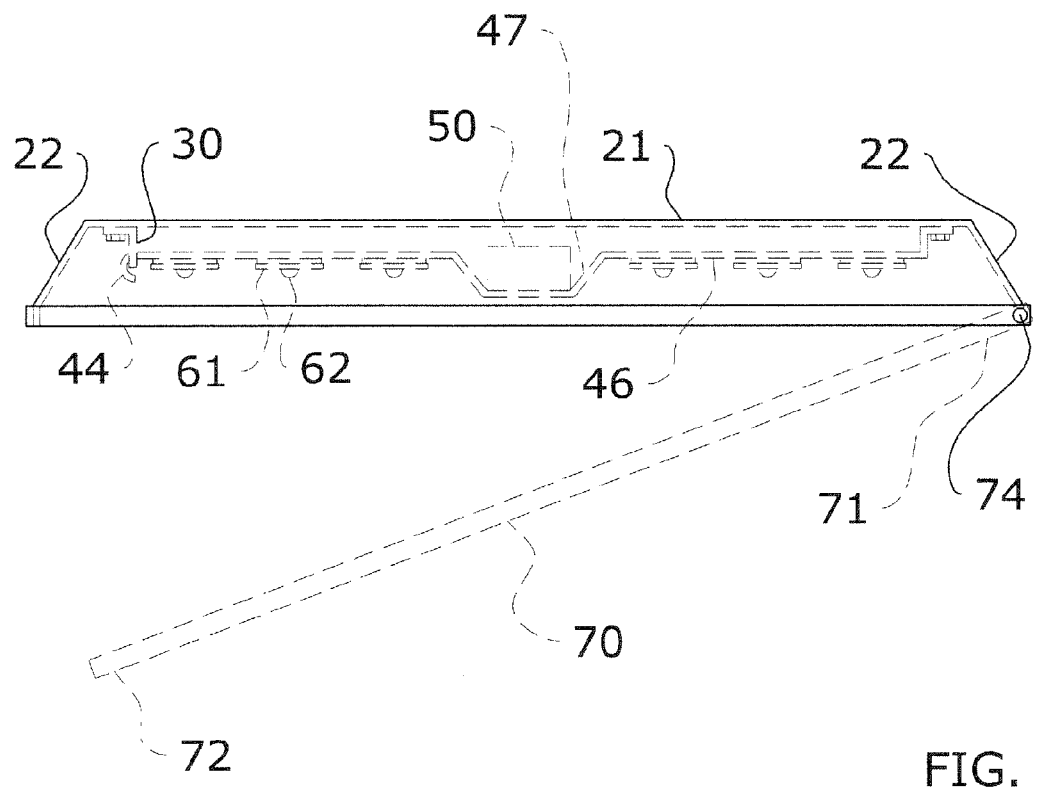
FIG. 9 is a front sectional view of the present invention illustrating the diffuser panel mounted to the support body and the diffuser panel including a pivot rod along one edge.

In one embodiment of the hinged diffuser panel 70, a pivot rod or pin 74 is used along the first edge 71 of the diffuser panel 70 and the peripheral edge of the side panels 22 of the support body 20 as illustrated in FIG. 9. In another embodiment, as illustrated in FIG. 8, of the hinged diffuser panel 70, the first edge 71 and possibly the second edge 72 include a hooked portion 75 which mates with a hooked portion 24 of the peripheral edge of the side panels 22, thus permitting pivotal movement of the diffuser panel 70 and removal and easy attachment of the first edge 71 and/or second edge 72 from the support body 20 by simply separating the hooked portions 24, 75. The hooked portions 24, 75 are preferably comprised of a square-shaped hooked structure.

H. Operation of Preferred Embodiment.

In use, the hooked portions 44 of the first edge 41 are inserted within the slots 31 of the hinge mount 30 so that the base plate 40 is pivotal with respect to the hinge mount 30 and support body 20. The power supply unit 50 attached to the base plate 40 is then electrically connected to an incoming power source, such as an AC power source or DC power source (not shown; however would generally be accomplished during the step illustrated in FIG. 3). The base plate 40 is then pivoted upwards toward a horizontal position so that the second edge 42 is aligned with openings on the opposite side of the top panel 21 of the support body 20 (as the hinge mount 30) and fasteners 49 are extended therethrough to secure the base plate 40 in a horizontal orientation.

The first edge 71 of the diffuser panel 70 is also hingedbly connected to the support body 20 via the pivot pin 74 or hooked portion 75 and the second edge 72 of the diffuser panel 70 is connected to the opposing side panel 22 of the support body 20 via pivoting the diffuser panel 70 to a horizontal orientation. The second edge 72 may then be secured using fasteners, or another hooked portion 74. If both the first edge 71 and the second edge 72 include a hooked portion 74, the diffuser panel 70 may need to be slid upon the support body 20, such as from front to back. It is appreciated that by pivotally connecting one side of the base plate 40 and/or diffuser panel 70 and then pivoting the other side of the base plate 40 and/or diffuser panel 70 toward a horizontal orientation to be affixed, the base plate 40 and/or diffuser panel 70 generally facilitate one-man installation.

Figure 10:
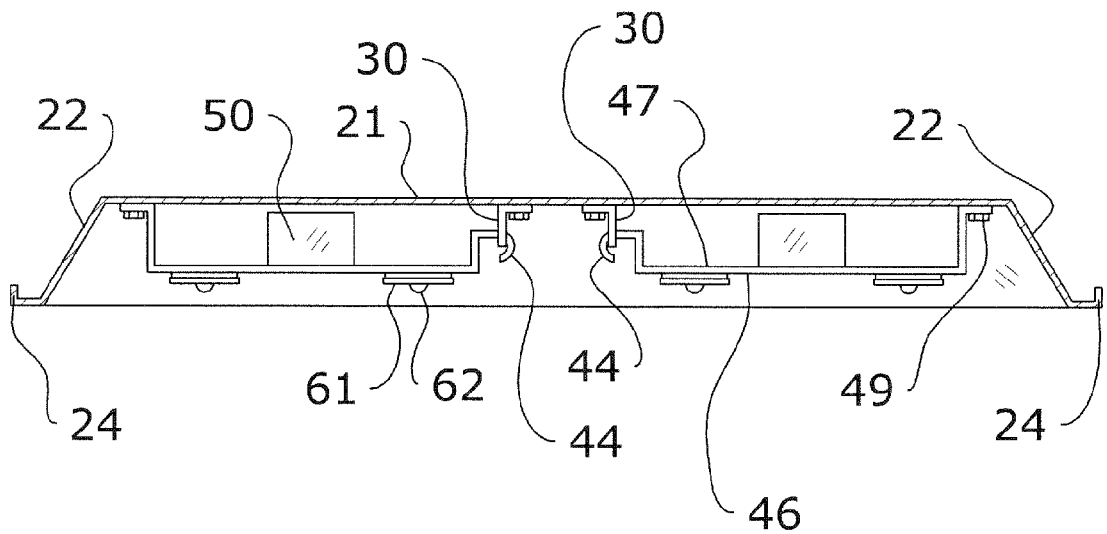
FIG. 10 is a front sectional view of the present invention illustrating an alternate embodiment of the base plate.
Figure 11:
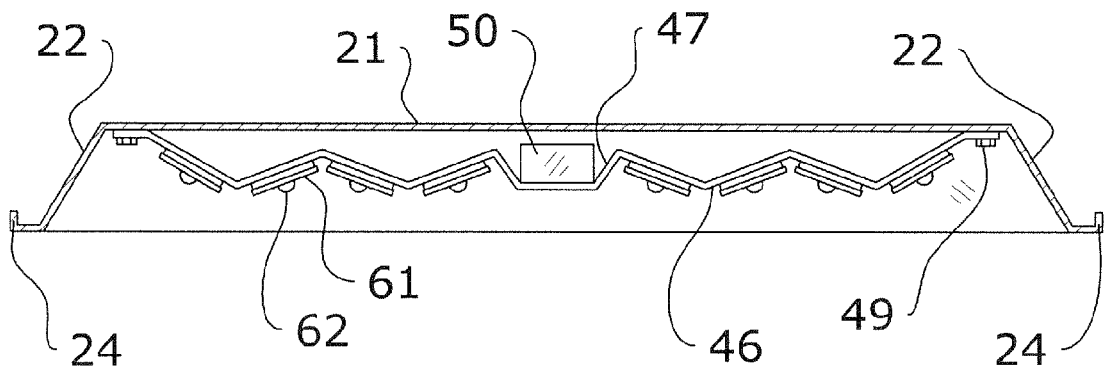
FIG. 11 is a front sectional view of the present invention illustrating another alternate embodiment of the base plate.
Figure 12:
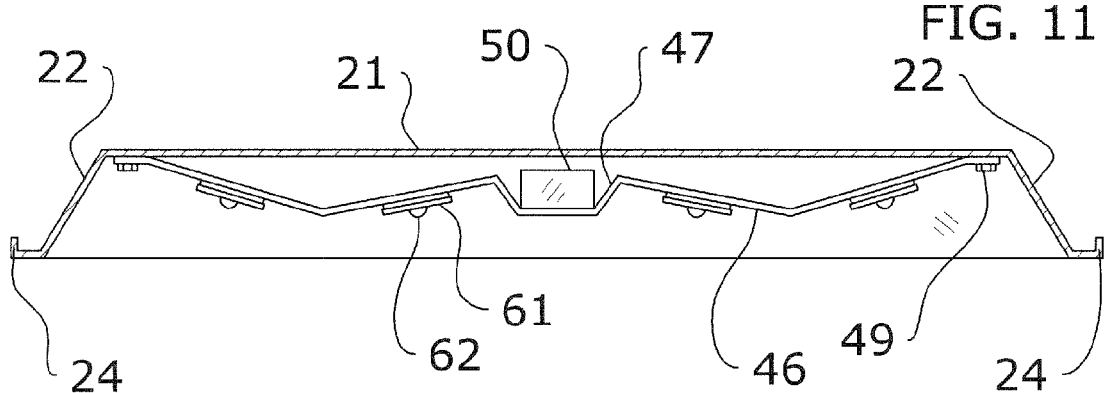
FIG. 12 is a front sectional view of the present invention illustrating yet another alternate embodiment of the base plate.

It is also appreciated that multiple base plate 40, power supply unit 50, and lighting unit 60 assemblies may be installed upon one base plate 40, such as by using multiple hinge mounts 30 and smaller sized assemblies in relation to the size of the top panel 21 of the support body 20 as illustrated in FIG. 10. Still alternately, it is appreciated that a single power supply unit 50 may be positioned between two support bodies 20, each including a base plate 40 and lighting units 60, wherein the power supply unit 50 powers all of the lighting units 60.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. In case of conflict, the present specification, including definitions, will control. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A light fixture, comprising:
a hollow support body;
a base plate mounted to said hollow support body;
a hinge means connecting one side of said base plate to said hollow support body for hinging said base plate with respect to said hollow support body;
a power supply unit mounted to said base plate; and
a plurality of lighting units, each being electrically connected to said power supply unit, and each being mounted to said base plate, said plurality of lighting units each including at least one light emitting element for emitting light.

2. The lighting fixture of claim 1, wherein said hollow support body has a top panel and a plurality of side panels extending from a peripheral edge of said top panel to define said hollow structure, said top panel being mounted to a ceiling, said base plate positioned within said hollow structure between said plurality of side panels.

3. The lighting fixture of claim 2, wherein said hollow support body is comprised of fluorescent lighting trough.

4. The lighting fixture of claim 1, wherein said base plate has a plurality of angled surfaces, said plurality of lighting units mounted on said plurality of angled surfaces.

5. The lighting fixture of claim 1, wherein said base plate is substantially flat along a mounting surface, said plurality of lighting units mounted to said flat mounting surface.

6. The lighting fixture of claim 1, wherein said hinge means includes:
a slotted structure mounted to said hollow support body;
a curved part extending from said base plate, said curved part is hingedbly received within said slotted structure for hinging said base plate with respect to said hollow support body.

7. The light fixture of claim 6, wherein said curved part is integral with said base plate, said curved part being a long edge of said base plate.

8. The light fixture of claim 1, wherein said base plate is comprised of a heat dissipating structure.

9. The light fixture of claim 8, wherein said base plate is comprised of an aluminum material.

10. The light fixture of claim 1, wherein said power supply unit is mounted along a top side of said base plate, said power supply unit being positioned within said hollow support body between said base plate and a top surface of said hollow support body, said power supply unit adapted to pivot with said base plate.

11. The light fixture of claim 1, wherein said plurality of lighting units are comprised of a plurality of individual strips dispersed along a bottom of said base plate.

12. The light fixture of claim 11, wherein each of said plurality of lighting units are attached to said base plate via a thermal adhesive compound.

13. The light fixture of claim 1, including a diffuser suspended below said plurality of lighting units, said diffuser being vertically spaced from said light emitting elements.

14. The light fixture of claim 13, wherein said diffuser is mounted to said hollow support body.

15. The light fixture of claim 14, wherein said diffuser is hingedbly mounted to said hollow support body via a second hinge means.

16. A light fixture, comprising:
a hollow support body;
a base plate mounted to said hollow support body, wherein said base plate is comprised of a heat dissipating aluminum material;
a power supply unit mounted to said base plate; and
a plurality of lighting units, each being electrically connected to said power supply unit, and each being mounted to said base plate, said plurality of lighting units each including at least one light emitting element for emitting light;
wherein said plurality of lighting units are comprised of a plurality of individual strips dispersed along a bottom of said base plate;
wherein said base plate, said power supply unit, and said plurality of lighting units are connected to said hollow support body as a one-piece structure.

17. The lighting fixture of claim 16, including a hinge means connecting one side of said base plate to said hollow support body for hinging said base plate with respect to said hollow support body.

18. The lighting fixture of claim 16, wherein said hollow support body is comprised of fluorescent lighting trough.

19. The lighting fixture of claim 16, wherein said base plate has a plurality of angled surfaces, said plurality of lighting units mounted on said plurality of angled surfaces.

20. A light fixture, comprising:
a ceiling mounted, hollow support body;
a base plate mounted to said hollow support body, wherein said base plate is comprised of a heat dissipating aluminum material;
a first hinge means connecting one side of said base plate to said hollow support body for hinging said base plate with respect to said hollow support body;
a power supply unit mounted along a top side of said base plate, said power supply unit being positioned within said hollow support body between said base plate and a top surface of said hollow support body, said power supply unit adapted to pivot with said base plate;
a plurality of lighting units, each being electrically connected to said power supply unit, and each being mounted to a bottom side of said base plate, said plurality of lighting units each including at least one light emitting element for emitting light;
wherein said plurality of lighting units are comprised of a plurality of individual strips dispersed along a bottom of said base plate;
a diffuser panel suspended below said plurality of lighting units, said diffuser panel being vertically spaced from said light emitting elements;
wherein said diffuser panel is mounted to said hollow support body; and
a second hinge means connecting one side of said diffuser panel to said hollow support body for hinging said diffuser panel with respect to said hollow support body, said diffuser panel being separately hinged with respect to said base plate.

* * * * *